UNITED STATES PATENT OFFICE.

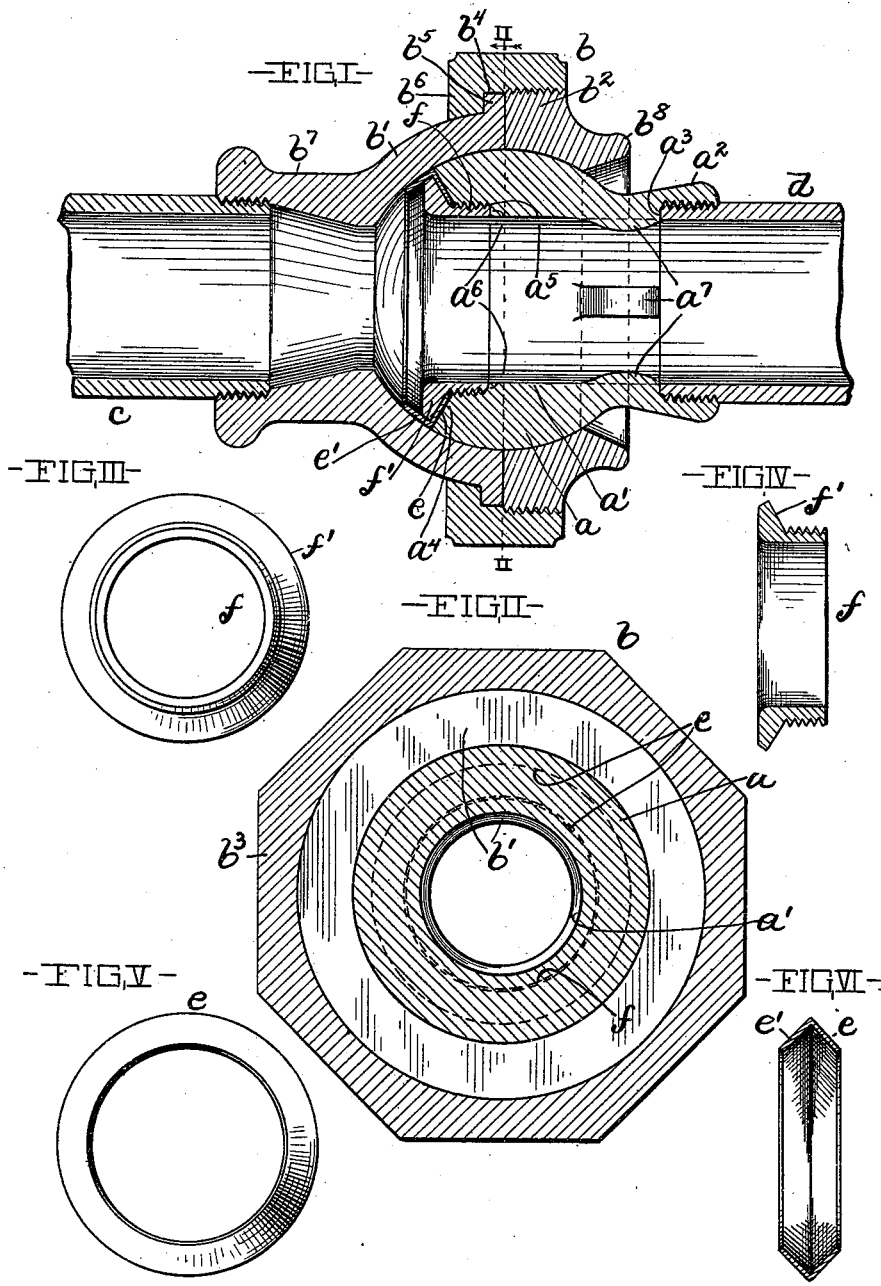

JAMES R. RENIFF, OF CHICAGO, ILLINOIS, ASSIGNOR TO WILLIAM G. TAYLOR, OF CLEVELAND, OHIO.

UNIVERSAL PIPE-COUPLING.

SPECIFICATION forming part of Letters Patent No. 664,291, dated December 18, 1900.

Application filed January 18, 1900. Serial No. 1,867. (No model.)

*To all whom it may concern:*

Be it known that I, JAMES R. RENIFF, residing at Chicago, Cook county, Illinois, have invented certain new and useful Improvements in Universal Pipe-Couplings; and I do hereby declare the following to be a full, clear, and exact description of the invention, such as will enable others skilled in the art to which it pertains to make and use the same.

My invention relates to improvements in universal-joint couplings for pipes, and more especially to a ball-and-socket coupling suitable for use in the formation of a metallic connection between air-pipes or steam-pipes of railway-cars.

The primary object of this invention is to provide a coupling of the character indicated that is not liable to leak and to utilize the fluid-pressure within the coupling in preventing leakage between the inner and externally ball-shaped coupling member and the external socket-forming companion member of the coupling.

With this object in view and to the end of rendering the construction simple, durable, and convenient the invention consists in certain features of construction and combinations of parts hereinafter described, and pointed out in the claims.

In the accompanying drawings, Figure I is a central longitudinal section of a coupling embodying my invention, and in this figure two pipes are shown coupled together by the said coupling. Fig. II is a transverse section on line II II, Fig. I, looking in the direction of the arrow. Fig. III is an end elevation of the packing-retaining ring employed in my improved coupling, and Fig. IV is a side elevation, in central section, of the same. Fig. V is an end elevation of the packing-ring, and Fig. VI is a side elevation, in central section, of the same.

Referring to the drawings, $a$ designates the inner and externally ball-shaped part or member of the coupling, and $b$ the outer and socket-forming part or member of the coupling. Part $b$ loosely but snugly embraces the part $a$. The part $a$ has a fluid-conducting bore or passage-way $a'$ extending centrally therethrough, which passage-way is instrumental in conducting the fluid under pressure—compressed air or steam, as the case may be—from the one to the other of the two pipes $c$ and $d$, that are coupled together by my improved coupling and are adjustable or movable at an angle to each other. The part $a$ is provided at its outer end with an annular shank $a^2$, that is screw-threaded internally to render it capable of receiving a correspondingly-threaded end of the pipe $d$, that in the case illustrated is coupled to the pipe $c$. The shank $a^2$, a suitable distance from its outer extremity, is provided internally with an annular shoulder $a^3$, that is adapted to be engaged by and form a stop or abutment for the adjacent end of the connected pipe $d$. The outer part $b$ of the coupling is composed, preferably, of three sections $b'$, $b^2$, and $b^3$. The sections $b'$ and $b^2$ compose the socket-forming shell that loosely but snugly embraces the inner part $a$ of the coupling, and the section $b^3$ is instrumental in securing the said shell-forming sections together. The section $b^2$ is screw-threaded externally adjacent to the section $b'$ and engaged by the correspondingly internally screw-threaded end portion of the section $b^3$, that therefore constitutes a nut that is screwed upon the section $b^2$. The nut $b^3$, at the inner end of its threaded portion, is provided internally with an annular smooth surface $b^4$, that snugly embraces an annular flange $b^5$, formed externally of and upon the inner end of the section $b'$. The sections $b'$ and $b^2$ adjoin each other centrally of the socket or shell formed thereby. The outer side of the flange $b^4$ forms an annular shoulder that is arranged in a plane parallel with the plane that contains the joint between the sections $b'$ and $b^2$ and is snugly engaged by an internal annular flange $b^6$, formed upon the outer end of the plain or unthreaded portion of the nut $b^3$. The flange $b^6$ has its inner edge conforming to the contour of the section $b'$, next to the external flange $b^4$ of the said section $b'$. The flange $b^5$ of the section $b'$ is necessarily smaller diametrically than the externally-threaded portion of the section $b^2$ to permit of the nut $b^3$ passing onto the section $b^2$ from the section $b'$. The said section $b'$ has its outer end terminating in an annular shank $b^7$, that is screw-threaded internally and engaged by the correspondingly externally threaded end of the connected pipe $c$. The section $b^2$ has its outer end terminating in an annular flange $b^8$, whose internal annular surface flares outwardly and has the arrangement required to accommodate a limited oscillation of the inner coupling member $a$ in every direction.

The assemblage of the parts hereinbefore described will be readily understood and is as follows: The inner coupling member $a$ and the section $b'$ of the socket-forming outer part of the coupling are first assembled by introducing the part $a$ into the chamber of the said section $b'$. The section $b^2$ of the outer part $b$ of the coupling is then slipped over the pipe-receiving shank of the coupling member $a$ to and against the section $b'$ of the part $b$, and of course the flange $b^8$ of the section $b^2$ is diametrically large enough internally to accommodate the slipping of the said section $b^2$ over the pipe-receiving shank of the part $a$. The sections $b'$ and $b^2$ having been properly assembled upon the part $a$, as hereinbefore described, the nut $b^3$ of the part $b$ is slipped over the pipe-receiving shank of the section $b'$ to and screwed upon the section $b^2$ until its internal flange abuts against the external flange formed upon the section $b'$.

Although the construction hereinbefore described is meritorious and valuable on account of its simplicity and convenience, the most important feature of my invention resides in positively preventing leakage between the parts of the coupling and in utilizing fluid-pressure within the coupling in assisting in the prevention of leakage.

The improved means that I have provided for preventing leakage between the parts $a$ and $b$ comprises, preferably, an annular shoulder $a^4$, formed upon the inner end of the part $a$ and flaring in the direction of and extending to the section $b'$ of the part $b$ and engaged by the corresponding inner end portion $e$ of a packing-ring that is composed of metal or other suitable material and is held in place upon the aforesaid shoulder by the packing-retaining ring $f$, secured to the part $a$ in any approved manner and having its outer end terminating in an external annular flange $f'$, that flares in the direction of the pipe-receiving end of the section $b'$ of the part $b$ of the coupling and securely holds the packing-ring against the aforesaid shoulder $a^4$. The central bore $a'$ of the part $a$ is preferably enlarged diametrically at the packing-bearing end of the said part, as at $a^5$, to render the said end of the bore capable of receiving the packing-retaining ring flush with the internal surface of the central or body portion of the part $a$ and to form an annular shoulder $a^6$ at the inner end of the said enlargement of the bore. The surrounding wall of the enlarged end of the said bore is screw-threaded and engaged by corresponding threads formed upon and externally of the packing-retaining ring, that abuts against the aforesaid shoulder $a^6$ when it is in its packing-securing position.

The aforesaid packing-ring has its outer end portion $e'$ arranged, preferably, at right angles to the inner end portion of the said ring and extending between the outer edge of the packing-retaining ring and the internal surface of the section $b'$ of the part $b$ of the coupling and beyond the said edge in the direction of the pipe-receiving end of the said section $b'$. The portion $e'$ of the packing possesses sufficient lateral flexibility to render it capable of being forced tightly against the internal surface of the section $b'$ when fluid under pressure is contained within the coupling, and consequently leakage between the parts $a$ and $b$ of the coupling when the latter is in use, forming a metallic connection between pipes that are operating, is positively prevented, and the fluid-pressure instead of being an active agency in incurring leakage actually and materially participates in the establishment of a perfectly fluid-tight joint between the parts of the coupling. I would remark also that the part $a$ of the coupling at the inner end of its shank $a^2$ and internally is provided, preferably, with several reinforcing-ribs $a^7$, arranged at suitable intervals circumferentially of the said shank.

What I claim is—

1. In a universal-joint coupling for pipes, the combination, with the inner and externally ball-shaped coupling member and the outer and socket-forming part of the coupling, which inner coupling member has its inner end provided with an annular shoulder $a^4$ facing in the direction of the pipe-connecting end of the outer coupling member, of a metallic packing-ring having its inner end portion engaging and conforming to the said shoulder and having its outer end portion freely engaging the internal surface of the outer coupling member, and means for engaging the inner end portion of the said packing-ring and securing the same to the inner coupling member.

2. In a universal-joint coupling for pipes, the combination, with the outer and socket-forming member of the coupling, and the inner and externally ball-shaped coupling member having a bore extending therethrough, and having its inner end provided with an annular shoulder facing in the direction of the outer or pipe-connecting end of the outer coupling member, of a packing-retaining ring secured to the inner end of the inner coupling member and provided with an external annular flange overlapping the aforesaid shoulder, and the packing interposed between the said shoulder and the aforesaid flange and extending between the flange's edge and the outer coupling member and beyond the said edge in the direction of the outer end of the said outer coupling member.

3. In a universal-joint coupling for pipes, the combination, with the outer or socket-forming member of the coupling provided, at one end, with a pipe-receiving shank, and the inner and externally ball-shaped coupling member within the socket-forming coupling member and provided, at the opposite end of the socket-forming coupling member, with a pipe-receiving shank, which inner coupling member has a fluid-conducting passage-way extending therethrough and is screw-threaded at its inner end, of a packing-ring engaging the inner end of the inner coupling member and extending to the internal surface of the socket-forming member of the coupling and having its outer end portion extending along the said surface in the direction of the pipe-receiving end of the said coupling member, and a packing-retaining ring having its inner end portion screw-threaded externally and screwed into the aforesaid threaded portion of the inner coupling member, the said packing-retaining ring having a member overlapping the outer side of the inner end portion of the packing-ring.

4. In a universal-joint coupling for pipes, the combination, with the outer and socket-forming member of the coupling, and the inner and externally ball-shaped and centrally-bored member adapted to connect with a pipe at its outer end and having its inner end provided with an annular shoulder facing in the direction of the outer end of the outer coupling member and screw-threaded internally next adjacent to the said shoulder, of an externally-screw-threaded packing-ring screwed into the said threaded portion of the inner coupling member and provided with an external annular flange overlapping the aforesaid shoulder, and the packing-ring interposed between the said shoulder and the aforesaid flange and extending between the flange's edge and the outer coupling member and beyond the said edge in the direction of the outer end of the said coupling member.

Signed by me at Chicago, Cook county, Illinois, this 6th day of January, 1900.

JAMES R. RENIFF.

Witnesses:
DON PHELPS,
L. A. WHITE.